July 7, 1925.
H. K. SPENCER
MAGNETIC HOLDING DEVICE
Filed May 16, 1921
1,544,695
2 Sheets-Sheet 1
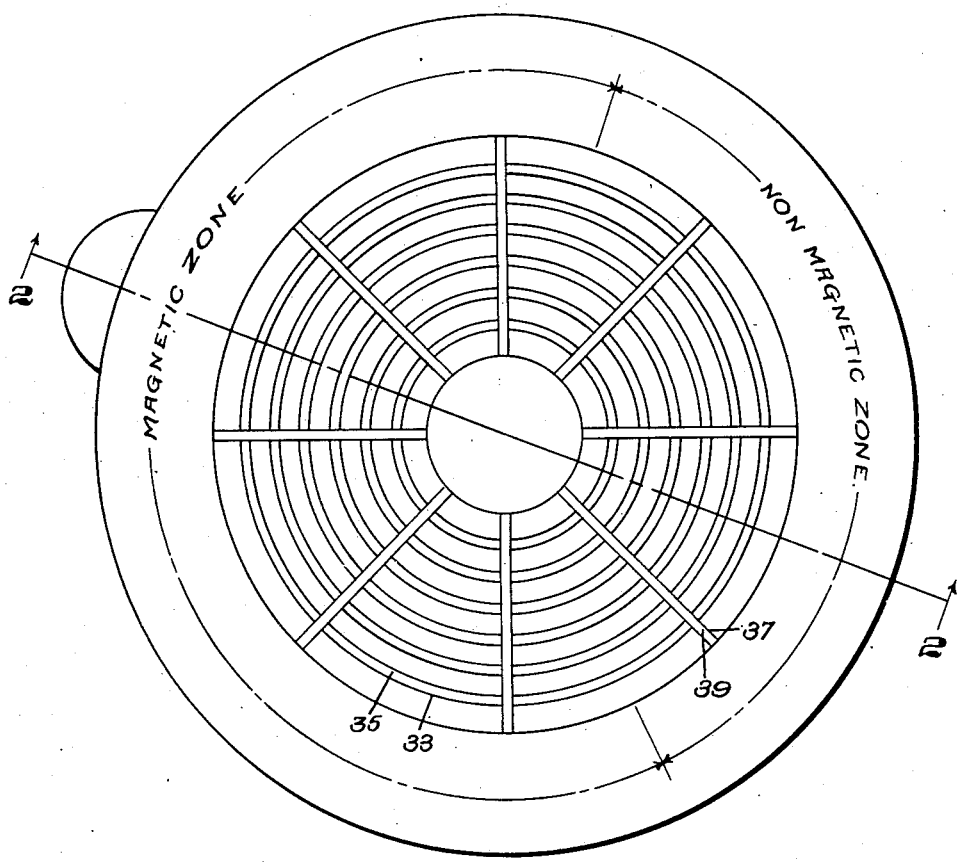
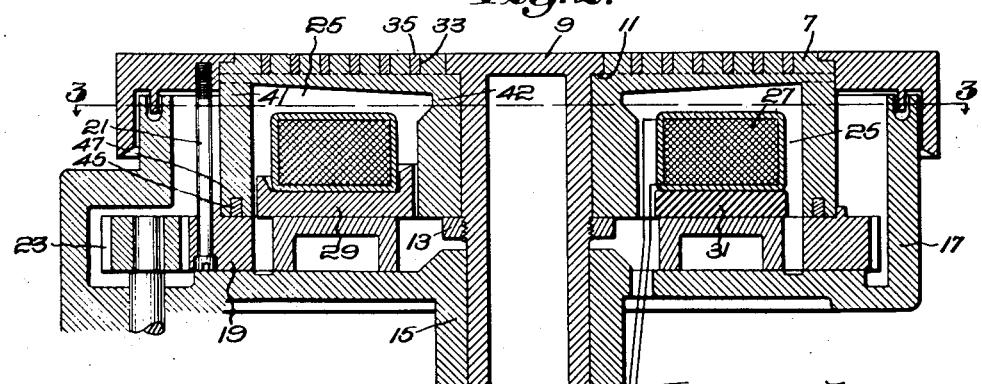
Inventor:
Henry K. Spencer,
by Emery, Booth, Janney, Warney
Attys.

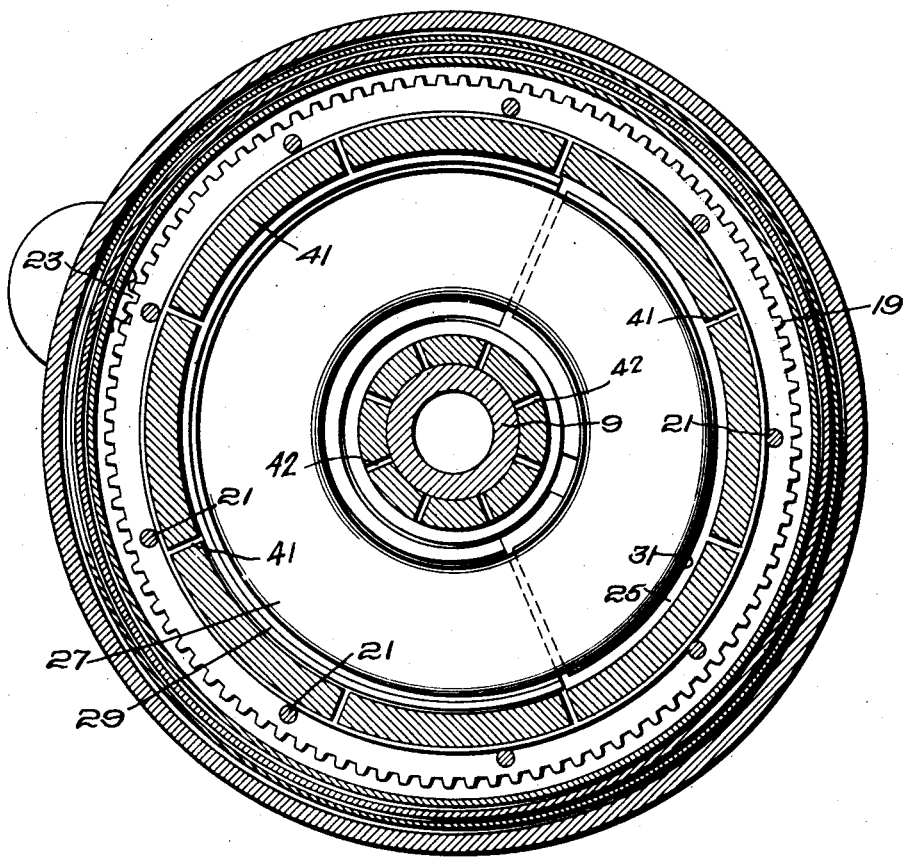

Patented July 7, 1925.

1,544,695

UNITED STATES PATENT OFFICE.

HENRY K. SPENCER, OF WATERTOWN, MASSACHUSETTS, ASSIGNOR TO THE BLANCHARD MACHINE COMPANY, OF CAMBRIDGE, MASSACHUSETTS, A CORPORATION OF MASSACHUSETTS.

MAGNETIC HOLDING DEVICE.

Application filed May 16, 1921. Serial No. 470,194.

*To all whom it may concern:*

Be it known that I, HENRY K. SPENCER, a citizen of the United States, and a resident of Watertown, in the county of Middlesex and State of Massachusetts, have invented an Improvement in Magnetic Holding Devices, of which the following description, in connection with the accompanying drawings, is a specification, like characters on the drawings representing like parts.

This invention relates to magnetic holding devices, and is more especially concerned with magnetic chucks for holding articles, while work is being performed thereon. The invention aims to provide means for enabling the articles to be placed on the work support, carried toward the point where the work is to be performed, magnetically held when they reach a predetermined point on the work support, and released after the work has been performed, thereby enabling the work to be carried on conveniently without the necessity of stopping the work support to reload the same from time to time.

The invention will be best understood by reference to the following description, when taken in connection with the accompanying drawings of one specific embodiment thereof, while its scope will be more particularly pointed out in the appended claims.

In the drawings:

Fig. 1 is a plan of a magnetic holding device embodying the invention;

Fig. 2 is a sectional view on line 2—2 of Fig. 1; and

Fig. 3 is a sectional view on line 3—3 of Fig. 2.

Referring to the drawings, and to the embodiment of the invention which is selected for exemplification, there is shown a magnetic chuck of the class exemplified by United States Letters Patent No. 1,125,198, issued to me January 19th, 1915, the same having a travelling work support 7, preferably formed of suitable magnetic material such as steel. In the present example, the motion of the work support is rotary, and herein it is carried by an upright spindle 9, which passes centrally therethrough, after which it may be conveniently secured by providing the spindle with a shoulder 11 against which the work support is clamped by a ring 13 threaded onto the spindle. The latter is mounted to turn in a suitable bearing 15, herein presented by a table 17. The work support may be rotated by suitable mechanism, herein a ring gear 19 secured thereto as by screws 21, and driven by a pinion 23.

In the operation of the machine, the pinion rotates the gear, and the latter turns the work support about a vertical axis, thereby carrying articles placed on the work support past the point where the work is to be performed. I will now describe the means whereby the work pieces are magnetically held when they reach a predetermined point in the travel of the work support, and are released after the work has been performed. The work support presents a chamber 25, which houses a magnetizing coil 27, whose convolutions encircle the axis about which the work support rotates.

The coil is suitably supported, herein in part by a stationary bottom plate 29 of magnetic material such as steel, and in part by a non-magnetic support 31, which may be formed of fiber. The sides of the stationary magnetic bottom plate are separated from the adjacent sides of the work support by a slight clearance, but the bottom plate presents with the work support a substantially continuous circuit for the magnetic flux. As in the aforesaid patent, some of the lines of force are diverted from the metallic circuit, and are compelled to flow through the pieces of work to be held by narrowing the path of the magnetic circuit adjacent the work surface of the chuck, as for example by providing the work support with a series of closely spaced concentric grooves 33, which may be and preferably are filled with rings 35 of suitable non-magnetic material such as brass. The spacing between the bottoms of these grooves and the top of the coil chamber is such that the effective cross section of the magnetic circuit is reduced about the chamber, and the greater part of the magnetic flux is compelled to flow between the grooves and through the parts to be magnetically held. These parts may be the pieces of magnetic work or non-magnetic pieces held in place by magnetic clamps, stops or other holders.

It should here be remembered that the magnetic plate 29 extends part way only about the axis of the work support, or in other words part way only of the travel of the work support. The purpose of this is to create a magnetic zone in which the work is held in fixed position with reference to the travelling work support, and a non-magnetic zone in which the pieces to be worked upon can be moved about and positioned in preparation for the work, and afterwards removed from the work support when the work has been completed. The extent of the magnetic zone will be determined by the extent of the magnetic plate.

In order to confine the magnetic flux to the desired area, the chuck body is herein suitably splined and grooved. In the present example, the face of the chuck body is provided with radial grooves 37, which may be filled with non-magnetic strips 39 to exclude foreign matter therefrom. The chuck body is further provided with two sets of radial slots 41 and 42, best shown in Fig. 3, to assist in the localization of the magnetic zone. These slots extend from the bottom of the chuck body up to the top of the chamber 25. It should therefore be evident from an inspection of Fig. 2 that there is comparatively little of the chuck body which presents a continuous annular connection between the segments formed by the described radial grooves and slots,—so little in fact that the magnetic leakage from one to the other is very slight. It is therefore apparent that the magnetic zone is confined substantially to the extent of the magnetic plate 29. When, therefore, the chuck body is rotated, and the work pieces are placed thereon within the non-magnetic zone represented in Fig. 1, they may be moved about freely by the hands of the operative, and properly positioned for the action of the work-performing means. Rotation of the chuck brings a procession of the work pieces successively into the magnetic zone represented in Fig. 1, and the pieces are immediately held in place on the chuck face. After the work has been performed, the pieces pass out of the magnetic zone into the non-magnetic zone, where they are released and can then be removed. To strengthen the chuck body where it is cut away by the slots 41, I have herein provided a non-magnetic ring 45, which is inserted in an annular groove 47 and ties the segments together. The general operation of the device, and the advantages which it presents, should be evident without further description.

Having thus described one embodiment of the invention, but without limiting myself thereto, what I claim and desire by Letters Patent to secure is:

1. In a magnetic holding device, the combination of a traveling support, a magnetizing coil extending throughout the path of said support and a relatively fixed magnetic body associated with said coil and extending along a part only of the path of said work support, whereby magnetic articles placed on said support are magnetically held in place thereon during such part of the travel.

2. In a magnetic holding device, the combination of a traveling, magnetic support, a magnetizing coil extending throughout the path of said support and a relatively fixed magnetic body associated with said coil and extending along a part only of the support, extending along a part only of the path of said work support, and with the latter presenting a circuit for the magnetic flux.

3. In a magnetic holding device, the combination of a magnetizing coil whose convolutions encircle an axis, a carrier rotatable about said axis, and a relatively fixed magnetic body associated with said coil and extending part way only about said axis, whereby magnetic articles placed on said support are magnetically held in place thereon during such part of the travel.

4. In a magnetic holding device, the combination of a magnetizing coil whose convolutions encircle an axis, a magnetic carrier rotatable about said axis, and a relatively fixed magnetic body associated with said coil and carrier and extending part way only about said axis and with said carrier presenting a circuit for the magnetic flux.

5. In a magnetic work-holding device, the combination of a support mounted to rotate about a generally upright axis and having an upwardly presented work-supporting surface upon which the magnetic articles repose by gravitation, a magnetizing coil encircling said axis and a fixed magnetic body associated with said coil and extending part way only about the axis of said work support, whereby magnetic articles resting on said work support by gravitation are magnetically held in place thereon during such part of the travel.

6. In a magnetic work-holding device, the combination of a fixed magnetizing coil, a support mounted above said coil to rotate about a generally upright axis and having a work-supporting surface upon which the magnetic articles repose by gravitation, and a fixed magnetic body associated with said coil and extending part way only about said axis, whereby the magnetic articles resting on said work support by gravitation are magnetically held in place thereon during such part of the travel.

7. In a magnetic work-holding device, the combination of a magnetizing coil disposed about a generally upright axis, a support mounted above said coil to rotate about said axis and having a generally horizontal, upwardly presented, work-supporting surface, and a fixed magnetic body associated with said coil and extending part way only about said axis, whereby magnetic articles resting on said surface are held in place thereon during such part of the travel.

8. In a magnetic work-holding device, the combination of a rotatable work support having a work-supporting surface generally normal to its axis, and a magnetizing coil and a magnetic body adapted to cooperate to attract magnetic bodies toward said surface in a direction lengthwise of said axis, said magnetic body extending part way only about said axis.

9. In a magnetic work-holding device, the combination of a rotatable work support having a work-supporting surface generally normal to its axis, said work support presenting a chamber, and a magnetizing coil and a magnetic body received in said chamber and adapted to cooperate to attract magnetic bodies toward said surface in a direction lengthwise of said axis, said magnetic body extending part way only about said axis.

10. In a magnetic work-holding device, the combination of a rotatable work support having a work-supporting surface generally normal to its axis, said work support presenting an annular chamber, an annular magnetizing coil within said chamber, and a magnetic body associated with said coil to attract magnetic bodies toward said surface in a direction lengthwise of said axis, said magnetic body extending part way only about said axis.

11. In a magnetic work-holding device, the combination of a rotatable work support having a work-supporting surface generally normal to its axis, said work support having means dividing the same into magnetic sectors, and a magnetizing coil and a magnetic body adapted to cooperate to attract magnetic bodies toward said surface in a direction lengthwise of said axis, said magnetic body extending part way only about said axis.

12. In a magnetic work-holding device, the combination of a rotatable work support having a work-supporting surface generally normal to its axis, said work support having means to cause the magnetic flux to be confined to the desired area, and a magnetizing coil and a magnetic body adapted to cooperate to attract magnetic bodies toward said surface in a direction lengthwise of said axis, said magnetic body extending part way only about said axis.

In testimony whereof, I have signed my name to this specification.

HENRY K. SPENCER.